(12) United States Patent
Miyazaki

(10) Patent No.: US 8,174,151 B2
(45) Date of Patent: May 8, 2012

(54) POWER SUPPLY CONTROL APPARATUS

(75) Inventor: Takahiro Miyazaki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 28 days.

(21) Appl. No.: 12/690,990

(22) Filed: Jan. 21, 2010

(65) Prior Publication Data

US 2010/0181831 A1   Jul. 22, 2010

(30) Foreign Application Priority Data

Jan. 22, 2009   (JP) ................ 2009-012363

(51) Int. Cl.
  *H02J 1/00*   (2006.01)
  *H02J 3/00*   (2006.01)
(52) U.S. Cl. ............................................. 307/82
(58) Field of Classification Search ............ 307/31, 307/81, 82
  See application file for complete search history.

(56) References Cited

U.S. PATENT DOCUMENTS

| 4,502,105 A | 2/1985 | Jessee |
| 4,504,899 A | 3/1985 | Jessee |
| 7,276,885 B1 * | 10/2007 | Tagare ................. 323/267 |

FOREIGN PATENT DOCUMENTS

| JP | 07-044603 U | 11/1995 |
| JP | 2004-180385 A | 6/2004 |

* cited by examiner

*Primary Examiner* — Jared Fureman
*Assistant Examiner* — Carlos Amaya
(74) *Attorney, Agent, or Firm* — Fujitsu Patent Center

(57) ABSTRACT

A power supply control apparatus includes a plurality of power supply units for supplying electric power to a plurality of electric circuits respectively. The power supply control apparatus receives pulse signals from the exterior. Each of the plurality of power supply units comprises a counter for counting the pulse signals. And a controller initiates to supply of the electric power to corresponding one of the electric circuits when the number of the pulse signals counted by the counter reaches the particular value which corresponds to an initiating timing of supplying electric power to corresponding one of the electric circuits.

4 Claims, 11 Drawing Sheets

RELATED ART  FIG. 8

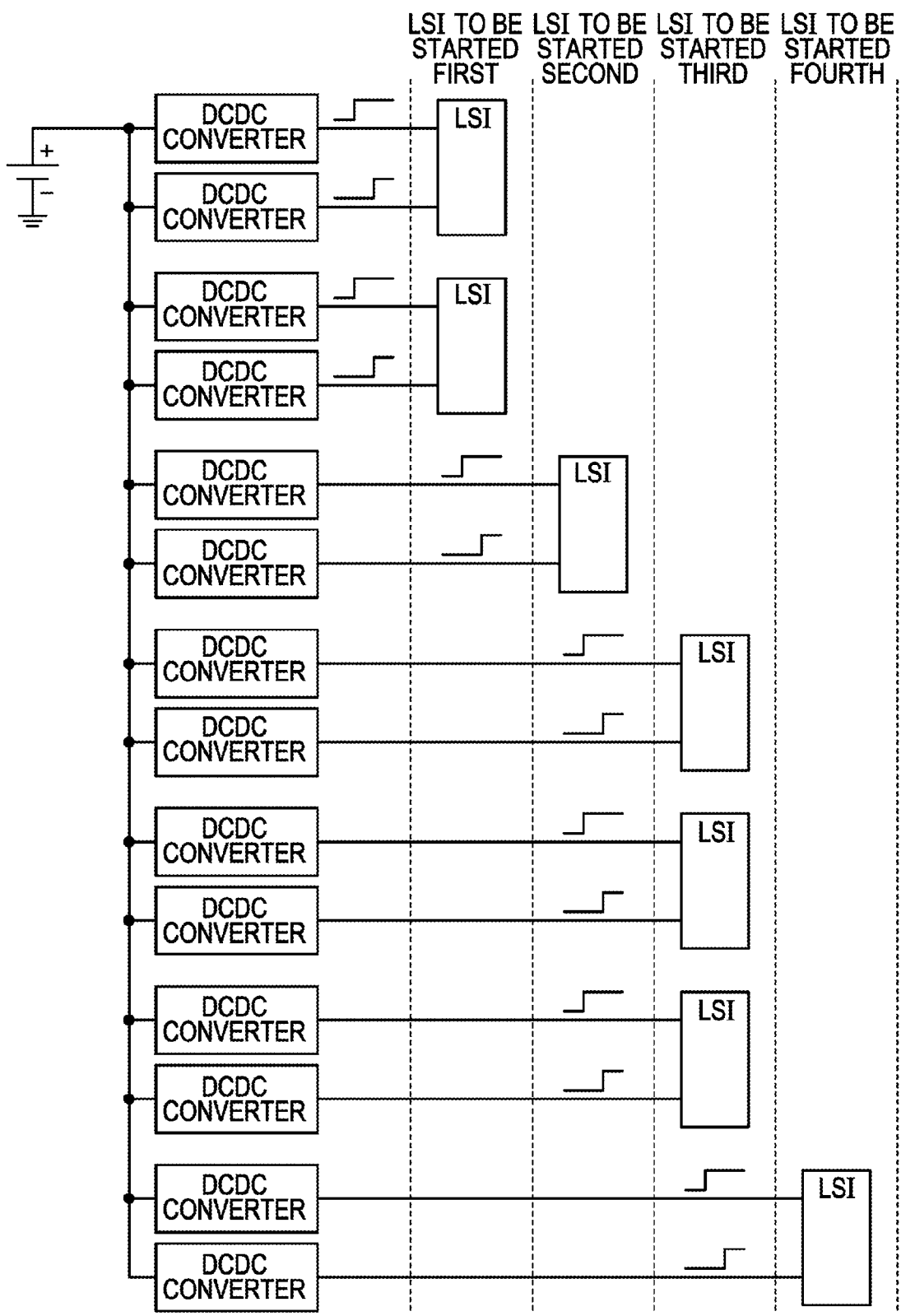
RELATED ART  FIG. 11

US 8,174,151 B2

POWER SUPPLY CONTROL APPARATUS

CROSS-REFERENCE TO RELATED APPLICATIONS

This application is based upon and claims the benefit of priority of the prior Japanese Patent Application No. 2009-12363, filed on Jan. 22, 2009, the entire contents of which are incorporated herein by reference.

FIELD

The embodiments discussed herein are related to a power supply control apparatus.

BACKGROUND

Devices such as LSIs (Large Scale Integrations) that use a plurality of power supplies, for example, a core power supply, an I/O (Input/Output) power supply, and the like often do not normally operate unless a proper power supply sequence is kept. Accordingly, various power supply control apparatus are devised and put into practical use to control the power supply sequence. A first power supply control apparatus (refer to, for example, Japanese Patent Application Laid-Open No. 2004-180385) and a second power supply control apparatus will be sequentially explained below as examples of conventional power supply control apparatus.

First, the first conventional power supply control apparatus will be explained. FIG. 7 is a view illustrating a configuration of the first conventional power supply control apparatus. As shown in FIG. 7, the first power supply control apparatus 10 has an input supply power source 11, DC-DC converters 12a to 12c, voltage monitoring circuits 13a, 13b, and a load circuit 14.

The input supply power source 11 is a circuit for supplying a voltage to the DC-DC converters 12a to 12c. A plus terminal of the input supply power source 11 is connected to Vin (+) of each of the DC-DC converters 12a to 12c, and a minus terminal of the input supply power source 11 is connected to Vin (−) of each of the DC-DC converters 12a to 12c. A voltage supplied from the input supply power source 11 to the DC-DC converters 12a to 12c is shown by Vin.

Each of the DC-DC converters 12a to 12c is a circuit which has Vin (+), Vin (−), Vout (+), Vout (−) and ON/OFF terminals, and supplies power to the load circuit 14 when it receives power from the input supply power source 11 and the ON/OFF terminal is turned "ON". In the following explanation, voltages supplied from the DC-DC converters 12a to 12c to the load circuit 14 are shown by Vout 1 to Vout 3.

The voltage monitoring circuit 13a is a circuit which is connected to Vout (+) and Vout (−) of the DC-DC converter 12a and sets the ON/OFF terminal of the DC-DC converter 12b to "ON" when it detects Vout 1 supplied from the DC-DC converter 12a to the load circuit 14.

The voltage monitoring circuit 13b is a circuit which is connected to Vout (+) and Vout (−) of the DC-DC converter 12b and sets the ON/OFF terminal of the DC-DC converter 12c to "ON" when it detects Vout 2 supplied from the DC-DC converter 12b to the load circuit 14.

The load circuit 14 is a circuit for executing various processing making use of the voltages sequentially supplied from the DC-DC converters 12a to 12c.

Next, operation waveforms of the first power supply control apparatus shown in FIG. 7 will be explained. FIG. 8 is a view illustrating the operation waveforms of the first power supply control apparatus. Note that the ON/OFF terminal of the DC-DC converter 12a is turned "ON".

When the input supply power source 11 supplies Vin to the DC-DC converters 12a to 12c (refer to Vin of FIG. 8), since the ON/OFF terminal of the DC-DC converter 12a is turned "ON", Vout 1 is output from the DC-DC converter 12a (refer to Vout 1 of FIG. 8).

When the voltage monitoring circuit 13a detects Vout 1 from the DC-DC converter 12a, the voltage monitoring circuit 13a applies a voltage S1 to the ON/OFF terminal of the DC-DC converter 12b (refer to S1 of FIG. 8), and the ON/OFF terminal of the DC-DC converter 12b is turned "ON". When the ON/OFF terminal of the DC-DC converter 12b is turned "ON", the Vout 2 is output from the DC-DC converter 12b (refer to Vout 2 of FIG. 8).

When the voltage monitoring circuit 13b detects Vout 2 from the DC-DC converter 12b, the voltage monitoring circuit 13b applies a voltage S2 to the ON/OFF terminal of the DC-DC converter 12c (refer to S2 of FIG. 8), and the ON/OFF terminal of the DC-DC converter 12c is turned "ON". When the ON/OFF terminal of the DC-DC converter 12c is turned "ON", Vout 3 is output from the DC-DC converter 12c (refer to Vout 3 of FIG. 8).

As described above, in the first power supply control apparatus 10, when, for example, powers are supplied to the load circuit 14 in the sequence of the DC-DC converters 12a to 12c, the DC-DC converters 12a to 12c are sequentially connected in this power supply sequence, and the voltage monitoring circuits 13a, 13b turn "ON" and "OFF" the ON/OFF terminals of the DC-DC converters 12b, 12c.

Next, the second conventional power supply control apparatus will be explained. FIG. 9 is a view illustrating a configuration of the second conventional power supply control apparatus. As shown in FIG. 9, the second power supply control apparatus 20 has an input supply power source 21, DC-DC converters 22a to 22c, a delay signal circuit 23, and a load circuit 24.

The input supply power source 21 is a circuit for supplying a voltage to the DC-DC converters 22a to 22c. A plus terminal of the input supply power source 21 is connected to Vin (+) of each of the DC-DC converters 22a to 22c, and a minus terminal of the input supply power source 21 is connected to Vin (−) of each of the DC-DC converters 22a to 22c. A voltage supplied from the input supply power source 21 to the DC-DC converters 22a to 22c is shown by Vin.

Each of the DC-DC converters 22a to 22c is a circuit which has Vin (+), Vin (−), Vout (+), Vout (−) and ON/OFF terminals and supplies power to the load circuit 24 when it receives power from the input supply power source 21 and the ON/OFF terminal is turned "ON". In the following explanation, voltages supplied from the DC-DC converters 22a to 22c to the load circuit 24 are shown by Vout 1 to Vout 3.

The delay signal circuit 23 is a circuit for outputting control signals to the DC-DC converters 22a to 22c according to a power supply sequence and sequentially turning "ON" the ON/OFF terminals of the DC-DC converters 22a to 22c. When, for example, voltages are sequentially supplied to the load circuit 24 in the order of Vout 1 to Vout 3, the delay signal circuit 23 inputs control signals S1 to S3 in the order of the DC-DC converters 22a to 22c.

The load circuit 24 is a circuit for executing various processing making use of the voltages sequentially supplied from the DC-DC converters 22a to 22c.

Next, operation waveforms of the second power supply control apparatus 20 shown in FIG. 9 will be explained. FIG. 10 is a view illustrating the operation waveforms of the second power supply control apparatus 20. Note that a case where voltages are supplied to the load circuit 24 in the order of Vout 1 to Vout 3 will be explained here as an example.

The input supply power source 21 supplies Vin to the DC-DC converters 22a to 22c (refer to Vin of FIG. 10). When the delay signal circuit 23 outputs a control signal S1 to the DC-DC converter 22a (refer to S1 of FIG. 10), the ON/OFF terminal of the DC-DC converter 22a is turned "ON", and Vout 1 is output from the DC-DC converter 22a (refer to Vout 1 of FIG. 10).

When the delay signal circuit 23 outputs a control signal S2 to the DC-DC converter 22b at a predetermined time interval after it outputs the control signal S1 to the DC-DC converter 22a (refer to S2 of FIG. 10), the ON/OFF terminal of the DC-DC converter 22b is turned "ON", and Vout 2 is output from the DC-DC converter 22b (refer to Vout 2 of FIG. 10).

When the delay signal circuit 23 outputs a control signal S3 to the DC-DC converter 22c at a predetermined time interval after it outputs the control signal S2 to the DC-DC converter 22b (refer to S3 of FIG. 10), the ON/OFF terminal of the DC-DC converter 22c is turned "ON", and Vout 3 is output from the DC-DC converter 22c (refer to Vout 3 of FIG. 10).

In the second power supply control apparatus, when, for example, powers are supplied to the load circuit 24 in the order of the DC-DC converters 22a to 22c as described above, the delay signal circuit 23 sequentially inputs the control signals S1 to S3 to the ON/OFF terminals of the DC-DC converters 22a to 22c in this sequence.

However, when the first power supply control apparatus 10 is assembled to an actual device and a power supply sequence is controlled, it is preferable to control a start-up sequence between elements in addition to the power supply sequence to the load circuit. FIG. 11 is a view illustrating an example where the first power supply control apparatus 10 is assembled to the actual device. As shown in FIG. 11, since it is preferable to control many DC-DC converters to control the power supply sequence to a plurality of LSIs, a start-up sequence becomes complex. Further, in the first power supply control apparatus 10, signal wires is connected to each other between the DC-DC converters according to the start-up sequence and thus many signal wires are wired in a complex fashion. Since various controls are executed on a highly dense wiring substrate in addition to a control of a power supply sequence, a space for wiring many wires does not remain in the wiring substrate unlike the first power supply control apparatus 10.

Further, once the first power supply control apparatus 10 is assembled to the actual device, it is very difficult to change a start-up sequence because destinations of connections of signal wires may be changed. Note that there is a possibility of avoiding difficulty of changing the start-up sequence by assembling the second power supply control apparatus 20 to an actual device. However, even if the second power supply control apparatus 20 is used, since different signal lines are connected from the delay signal circuit 23 to the DC-DC converters, a problem of pressing a region on a wiring substrate may not be overcome as in the first power supply control apparatus 10.

SUMMARY

According to an aspect of the embodiment, a power supply control apparatus includes a plurality of power supply units for supplying electric power to a plurality of electric circuits respectively, the power supply apparatus receiving pulse signals from the exterior, each of the plurality of power supply units comprising; a counter for counting the pulse signals and, a controller for initiating to supply of the electric power to corresponding one of the electric circuits when the number of the pulse signals counted by the counter reaches the particular value which corresponds to a initiating timing of supplying electric power to corresponding one of the electric circuits.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 11 is a view illustrating an example where the first power supply control apparatus is assembled to an actual device.

DESCRIPTION OF EMBODIMENTS

Embodiment 1

When a power supply control apparatus according to Embodiment 1 controls a power supply sequence to a load circuit, respective DC-DC converters control the power supply sequence by adjust timings at which they output powers based on the pulse number included in the pulse signal.

Figure 1:
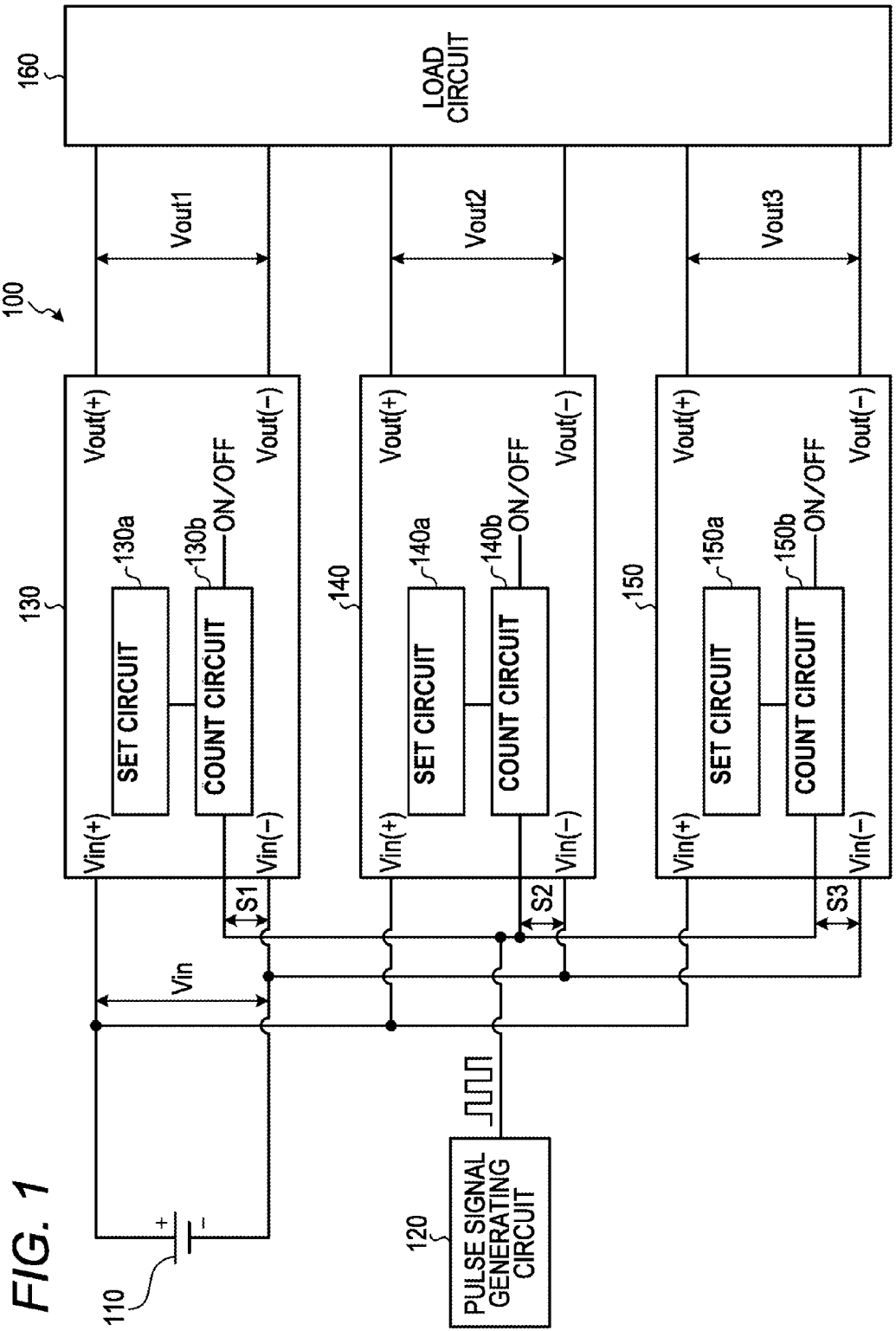
FIG. 1 is a view illustrating a configuration of a power supply control apparatus according to Embodiment 1.

Next, a configuration of the power supply control apparatus according to Embodiment 1 will be explained. FIG. 1 is a view illustrating a configuration of the power supply control apparatus according to Embodiment 1. As shown in FIG. 1, a power supply control apparatus 100 has an input supply power source 110, a pulse signal generating circuit 120, DC-DC converters 130 to 150, and a load circuit 160.

The input supply power source 110 is a circuit for supplying a voltage to the DC-DC converters 130 to 150. A plus terminal of the input supply power source 110 is connected to Vin (+) of each of the DC-DC converters 130 to 150, and a minus terminal of the input supply power source 110 is connected to Vin (−) of each of the DC-DC converters 130 to 150. The voltage supplied from the input supply power source 110 to the DC-DC converters 130 to 150 is shown by Vin.

The pulse signal generating circuit 120 is a circuit for generating a pulse signal. The pulse signal generating circuit 120 outputs the generated pulse signal to the DC-DC converters 130 to 150.

The DC-DC converter 130 is a circuit for obtaining the pulse signal from the pulse signal generating circuit 120 and outputting a voltage Vout 1 to the load circuit 160 when the pulse number of the obtained pulse signal reaches a predetermined number. Specifically, the DC-DC converter 130 has a set circuit 130a and a count circuit 130b. Note that the DC-DC converter 130 has Vin (+), Vin (−), Vout (+), Vout (−), and ON/OFF terminals as terminals.

The set circuit 130a is a circuit for setting a pulse number of a pulse signal acting as a timing at which the Vout 1 is output. In the following explanation, the pulse number set by the set circuit 130a is shown as a first pulse number.

The count circuit 130b is a circuit for counting the pulse number of the pulse signal output from the pulse signal generating circuit 120 and turns "ON" the ON/OFF terminal when the counted pulse number reaches the first pulse number. When the ON/OFF terminal of the DC-DC converter 130 is turned "ON" in a state that Vin is applied thereto from the input supply power source 110, the DC-DC converter 130 outputs the voltage Vout 1 to the load circuit 160.

The DC-DC converter 140 is a circuit for obtaining the pulse signal from the pulse signal generating circuit 120 and outputting a voltage Vout 2 to the load circuit 160 when the pulse number of the obtained pulse signal reaches a predetermined number. Specifically, the DC-DC converter 140 has a set circuit 140a and a count circuit 140b. Note that the DC-DC converter 140 has Vin (+), Vin (−), Vout (+), Vout (−), and ON/OFF terminals as terminals.

The set circuit 140a is a circuit for setting a pulse number of a pulse signal acting as a timing at which Vout 2 is output. In the following explanation, the pulse number set by the set circuit 140 is shown as a second pulse number.

The count circuit 140b is a circuit for counting the pulse number of the pulse signal output from the pulse signal generating circuit 120 and turns "ON" the ON/OFF terminal when the counted pulse number reaches the second pulse number. When the ON/OFF terminal of the DC-DC converter 140 is turned "ON" in a state that Vin is applied thereto from the input supply power source 110, the DC-DC converter 140 outputs the voltage Vout 2 to the load circuit 160.

The DC-DC converter 150 is a circuit for obtaining the pulse signal from the pulse signal generating circuit 120 and outputting a voltage Vout 3 to the load circuit 160 when the pulse number of the obtained pulse signal reaches a predetermined number. Specifically, the DC-DC converter 150 has a set circuit 150a and a count circuit 150b. Note that the DC-DC converter 150 has Vin (+), Vin (−), Vout (+), Vout (−), and ON/OFF terminals as terminals.

The set circuit 150a is a circuit for setting a pulse number of a pulse signal acting as a timing at which Vout 3 is output. In the following explanation, the pulse number set by the set circuit 150a is shown as a third pulse number.

The count circuit 150b is a circuit for counting the pulse number of the pulse signal output from the pulse signal generating circuit 120 and turns "ON" the ON/OFF terminal when the counted pulse number reaches the third pulse number. When the ON/OFF terminal of the DC-DC converter 150 is turned "ON" in a state that Vin is applied thereto from the input supply power source 110, the DC-DC converter 150 outputs the voltage Vout 3 to the load circuit 160.

The load circuit 160 is a circuit for executing various processes making use of the voltages sequentially supplied from the DC-DC converters 130 to 150. A core circuit, an IO circuit, and various LSIs, for example, are mounted on the load circuit 160.

A sequence of the first, second, and third pulse numbers set to the count circuits 130b to 150b may be sufficiently adjusted according to the power supply sequence of the voltages Vout 1 to 3 to adjust the power supply sequence of the voltages Vout 1 to 3 supplied to the load circuit 160. When, for example, the voltages Vout 1, Vout 2, and Vout 3 are sequentially supplied to the load circuit 160 in this order, the first, second, and third pulse numbers may be sufficiently adjusted such that first pulse number<second pulse number<third pulse number.

Figure 2:
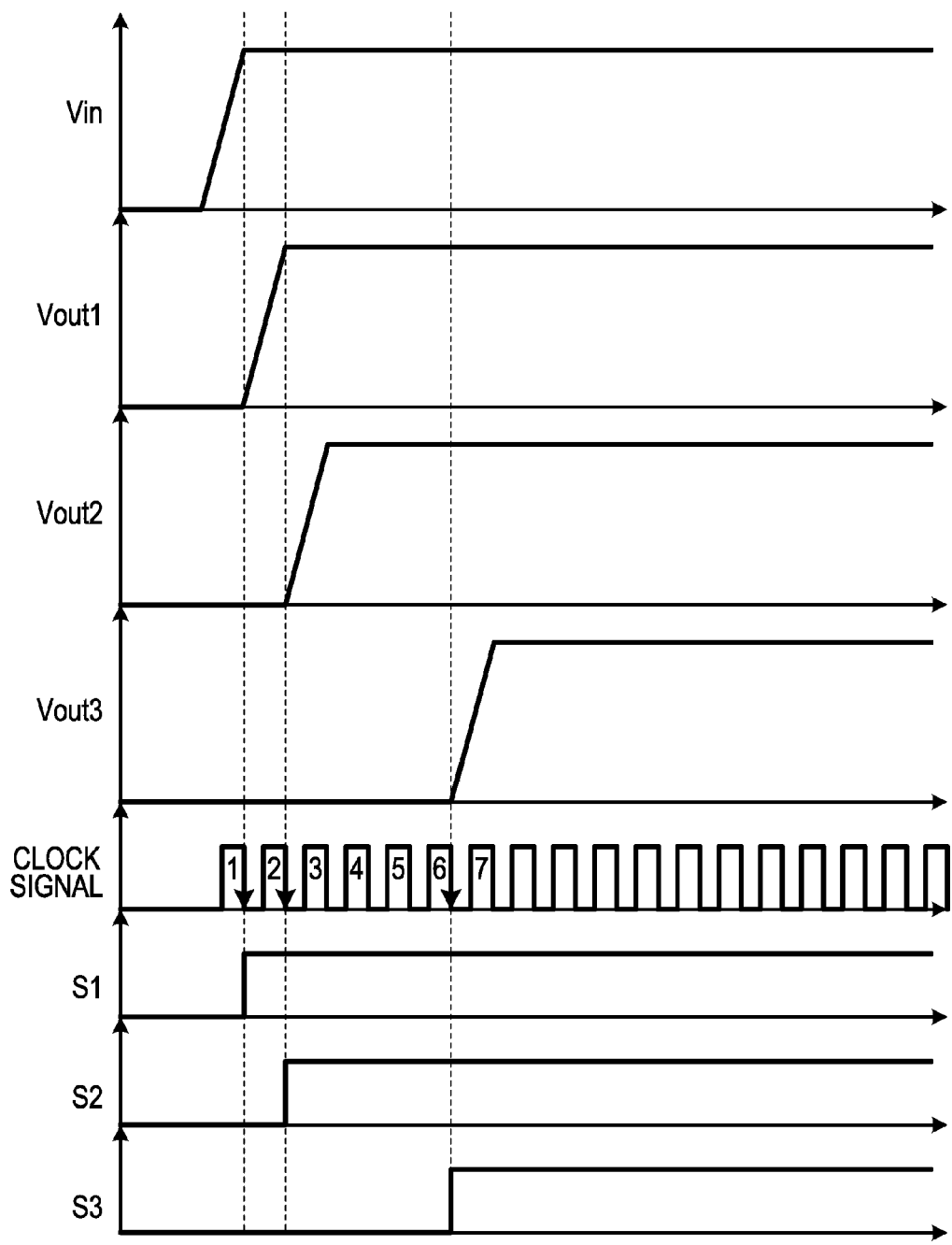
FIG. 2 is a view illustrating operation waveforms of the power supply control apparatus according to Embodiment 1.

Next, operation waveforms of the power supply control apparatus 100 shown in FIG. 1 will be explained. FIG. 2 is a view illustrating the operation waveforms of the power supply control apparatus 100 according to Embodiment 1. Note that the first pulse number of the count circuit 130b is set to "1", the second pulse number of the count circuit 140b is set to "2", and the third pulse number of the count circuit 150b is set to "6" as an example.

The input supply power source 110 starts to supply Vin (refer to Vin of FIG. 2) to the DC-DC converters 130 to 150 while the pulse signal generating circuit 120 outputs the pulse signal to the DC-DC converters 130 to 150 (refer to clock signal of FIG. 2).

The count circuit 130b obtains the pulse signal output from the pulse signal generating circuit 120 and outputs a control signal S1 to the ON/OFF terminal (refer to S1 of FIG. 2) at the time the pulse number becomes "1" to thereby turn "ON" the ON/OFF terminal. When the ON/OFF terminal is turned "ON", the DC-DC converter 130 outputs Vout 1 (refer to Vout 1 of FIG. 2).

The count circuit 140b obtains the pulse signal output from the pulse signal generating circuit 120 and outputs a control signal S2 to the ON/OFF terminal at the time the pulse number becomes "2" (refer to S2 of FIG. 2) to thereby turn "ON" the ON/OFF terminal. When the ON/OFF terminal is turned "ON", the DC-DC converter 140 outputs Vout 2 (refer to Vout 2 of FIG. 2).

The count circuit 150b obtains the pulse signal output from the pulse signal generating circuit 120 and outputs a control signal S3 to the ON/OFF terminal at the time the pulse number becomes "6" (refer to S3 of FIG. 6) to thereby turn "ON" the ON/OFF terminal. When the ON/OFF terminal is turned "ON", the DC-DC converter 150 outputs Vout 3 (refer to Vout 3 of FIG. 2).

As described above, in Embodiment 1, a timing at which the voltage is output to the load circuit 160 is determined and the voltage is output to the load circuit 160 by that the pulse signal generating circuit 120 outputs the pulse signals to the DC-DC converters 130 to 150 using one start-up signal line and the DC-DC converters 130 to 150 count the pulse numbers of the pulse signals, respectively. As a result, the power supply sequence to the load circuit can be accurately controlled without pressing a wiring region of a highly dense wiring substrate.

Next, the set circuit and the count circuit shown in FIG. 1 will be explained in detail. The explanation will be made exemplifying the set circuit 130a and the count circuit 130b. Note that explanation of the set circuits 140a and 150a and the count circuits 140b, 150b is the same as that of the set circuit 130a and the count circuit 130b.

Figure 3:
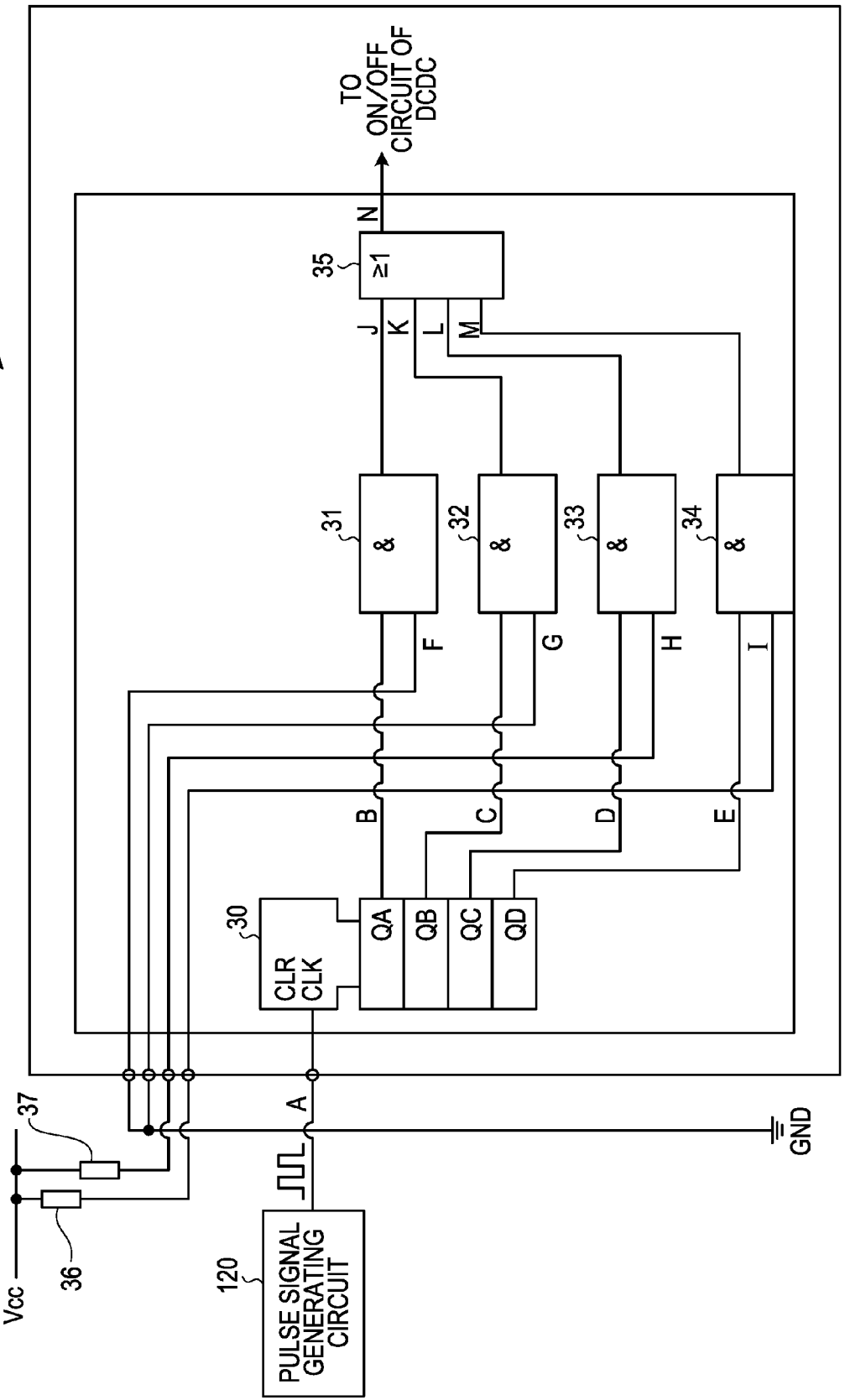
FIG. 3 is a view for explaining a set circuit and a count circuit unit according to Embodiment 1 in detail.

FIG. 3 is a view explaining the set circuit and the count circuit according to Embodiment 1. As shown in FIG. 3, the set circuit and the count circuit have a shift register 30, AND circuits 31 to 34, an OR circuit 35, and pull-up resistors 36, 37.

Among them, the shift register 30 is a circuit for switching outputs B to E from Low to High in response to the pulse number of a pulse signal A output from the pulse signal generating circuit 120. Note that the shift register 30 is connected to the AND circuits 31 to 34, and the outputs B to E output from the shift register 30 are input to the AND circuits 31 to 34, respectively.

Specifically, the shift register 30 obtains the pulse signal A, switches the output B from Low to High in response to a first pulse, and switches the output C from Low to High in response to a second pulse. Further, the shift register 30 switches the output D from Low to High in response to a third pulse and switches the output E from Low to High in response to a fourth pulse.

The AND circuits 31 to 34 are circuits having two input terminals and one output terminal and outputting High from the output terminal when signals input to the two input terminals become High. One of the input terminals of each of the AND circuits 31 to 34 is connected to GND or to any one of the pull-up resistors according to the first pulse number.

How the AND circuits 31 to 34 are connected when the count circuit 130b turns "ON" the ON/OFF terminal at the time the first pulse number is "3", that is, the pulse number becomes "3" will be explained.

The output B of the shift register 30 is connected to one of the input terminals of the AND circuit 31, and the other input terminal is connected to GND. Further, the output terminal of the AND circuit 31 is connected to the OR circuit 35. Since one of the input terminals of the AND circuit 31 is connected to GND, the AND circuit 31 outputs Low to the OR circuit 35 at all times.

The output C of the shift register 30 is connected to one of the input terminals of the AND circuit 32, and the other input terminal is connected to GND. Further, the output terminal of the AND circuit 31 is connected to the OR circuit 35. Since one of the input terminals of the AND circuit 32 is connected to GND, the AND circuit 32 outputs Low to the OR circuit 35 at all times.

The output D of the shift register 30 is connected to one of the input terminals of the AND circuit 33, and the pull-up resistor 37 is connected to the other input terminal. Further, the output terminal of the AND circuit 33 is connected to the OR circuit 35. Since one of the input terminals of the AND circuit 33 is connected to the pull-up resistor 37, the input terminal connected to the pull-up resistor 37 becomes High at all times. Accordingly, the AND circuit 33 switches an output of the output terminal to High at the time the output D connected to the input terminal becomes High (at the time the pulse number becomes 3).

The output E of the shift register 30 is connected to one of the input terminals of the AND circuit 34, and the pull-up resistor 36 is connected to the other input terminal. Further, the output terminal of the AND circuit 34 is connected to the OR circuit 35. Since one of the input terminals of the AND circuit 34 is connected to the pull-up resistor 36, the input terminal connected to the pull-up resistor 36 becomes High at all times. Accordingly, the AND circuit 34 switches an output of the output terminal to High at the time the output E connected to the input terminal becomes High (at the time the pulse number becomes 4).

The OR circuit 35 is a circuit connected to the output terminals of the AND circuits 31 to 34 and turning "ON" the ON/OFF terminal at the time the output of any of the AND circuits 31 to 34 becomes High. Note that, as shown in FIG. 3, when the AND circuits 31, 32 are connected to GND and the AND circuits 33, 34 are connected to the pull-up resistors 36, 37, an output of the AND circuit 33 becomes High at the time the pulse number becomes "3". When the output of the AND circuit 33 becomes High, the OR circuit 35 turns "ON" the ON/OFF terminal.

The pull-up resistors 36, 37 are resistors for keeping signal lines connected to the input terminals of the AND circuits 33, 34 in a High state.

Figure 4:
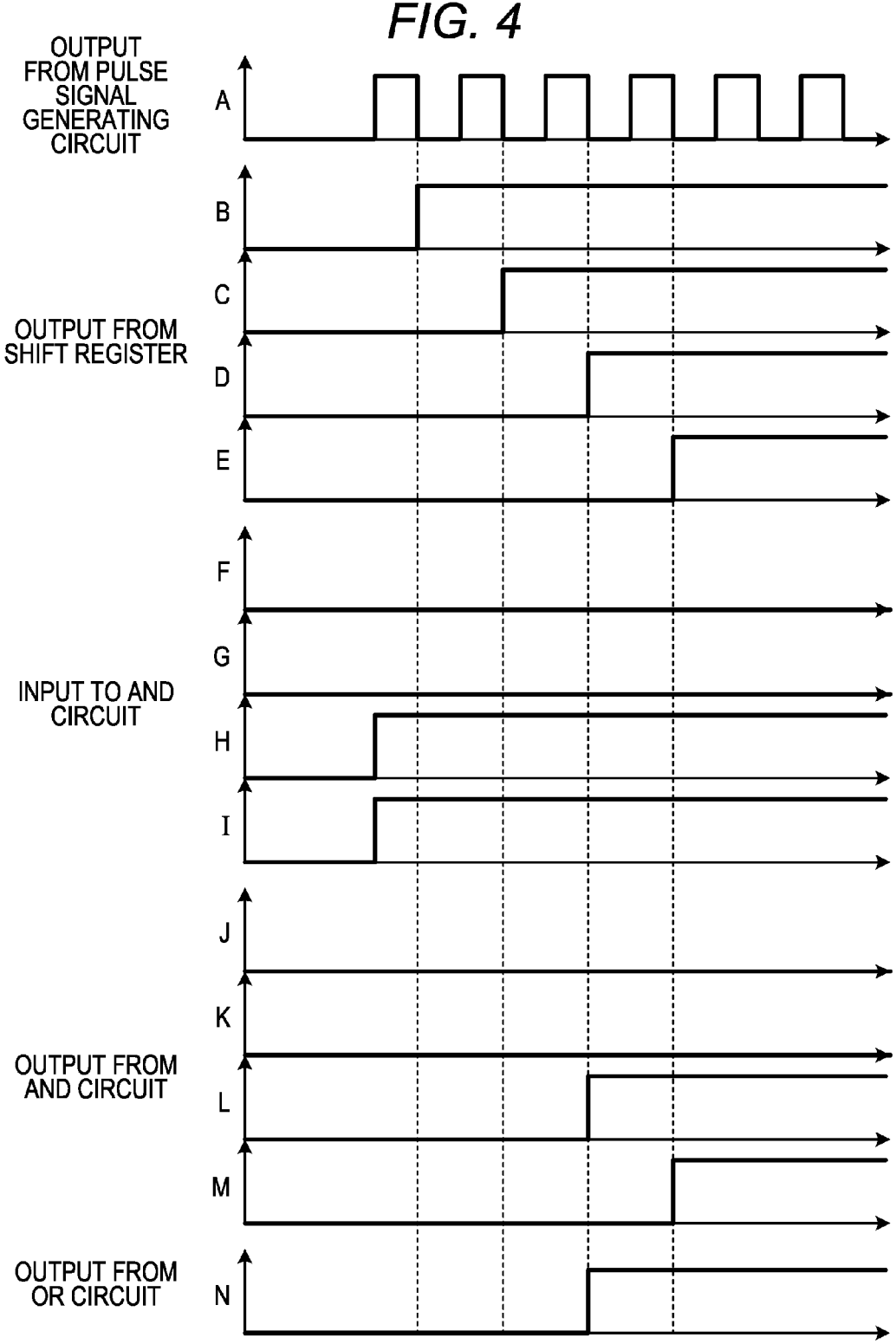
FIG. 4 is a view illustrating operation waveforms of a pulse signal generating circuit, a shift register, an AND circuit, and an OR circuit.

Next, operation waveforms of the pulse signal generating circuit 120, the shift register 30, the AND circuits 31 to 34, and the OR circuit 35 shown in FIG. 3 will be explained. FIG. 4 is a view illustrating the operation waveforms of the pulse signal generating circuit 120, the shift register 30, the AND circuits 31 to 34, and the OR circuit 35.

As shown in FIG. 4, the outputs from the AND circuits 31, 32 become Low at all times regardless of a pulse number of the pulse signal output from the pulse signal generating circuit 120 to the shift register 30 (refer to outputs J, K of the AND circuit of FIG. 4).

In contrast, the output D of the shift register 30 becomes High at the time the pulse number input to the shift register 30 becomes "3" (refer to the output B of the shift register of FIG. 4), and an output L of the AND circuit 33 becomes High (refer to the output L of the AND circuit of FIG. 4). Then, the output of the OR circuit 35 becomes High by that the output L of the AND circuit 33 becomes High (refer to an output N of the OR circuit of FIG. 4).

As shown in FIG. 3, a signal can be output after an arbitrary pulse number by setting ones of the inputs of the AND circuits 31 to 34 to Low or High. When, for example, a signal is output in response to the second pulse unlike FIG. 3, it is preferable to connect Low (GND) to one of the input terminals of the AND circuit 31 and to connect High (one of the pull-up resistors) to one of the input terminals of the AND circuits 32 to 34.

Further, in the case shown in FIG. 3, pulses up to the fourth pulse are treated using the shift register 30 and the four AND circuits 31 to 34. However, when the number of the shift register and the AND circuits is increased, a pulse having any arbitrary number can be treated. Further, in FIG. 3, a timing at which the ON/OFF terminal is controlled by connecting the pull-up resistors 36, 37 and GND to the AND circuits 31 to 34, but the embodiment is not limited thereto. A circuit, which outputs Low or High to the input terminals of the AND circuits 31 to 34 in response to, for example, a rewritable storage element and an external control signal, may be provided.

As described above, the power supply control apparatus 100 according to Embodiment 1 controls a power supply to the load circuit 160 by connecting the one control signal wire from the pulse signal generating circuit 120 to the DC-DC converters 130 to 150, which adjust a timing at which a voltage is output by counting a pulse number of the pulse signal generated by the pulse signal generating circuit 120. As a result, a complex sequence control can be provided even in a highly dense wiring substrate without pressing other signal wires and thus a power supply circuit can be mounted on a device having more dense wires.

In a conventional voltage monitor circuit and a conventional delay signal circuit, since setting of a sequence is changed by a configuration of a load circuit, the number of components increases because the sequence preferably be variously set, and thus a sequence setting cost and a manufacture management cost become expensive. However, in the power supply control apparatus 100 of Embodiment 1 according to the invention, since a sequence can be set only by setting a pulse number by a logic circuit, even if a configuration of a load circuit changes, the change of the configuration of the load circuit can be coped with by logically changing a pulse being set by the same circuit, and thus a design manpower cost and a manufacture management cost can be reduced.

In the power supply control apparatus 100 according to Embodiment 1, a start-up sequence can be arbitrarily changed only by changing setting of a control circuit without switching a destination of connection of a control line. As a result, the start-up sequence can be changed by simply changing setting without modifying a wiring substrate.

Embodiment 2

Next, a power supply control apparatus according to Embodiment 2 will be explained. The power supply control apparatus according to Embodiment 2 has a plurality of one-shot pulse generators for outputting single pulse signals in place of the pulse signal generating circuit 120 of the power supply control apparatus 100 shown in Embodiment 1, and respective DC-DC converters control a power supply sequence by adjusting a timing at which they output power based on the number of one-shot pulses output from the one-shot pulse generators.

Figure 5:
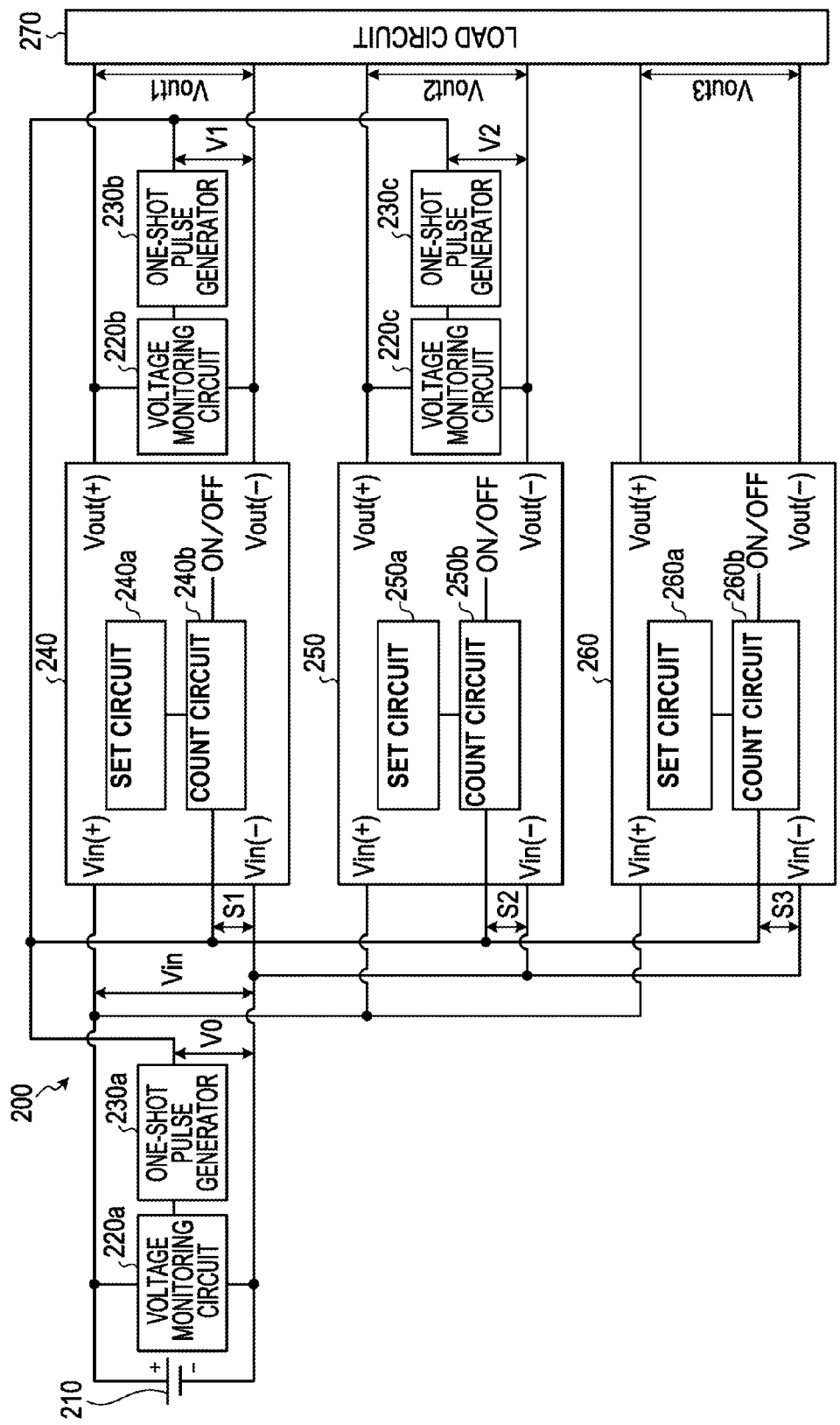
FIG. 5 is a view illustrating a configuration of a power supply control apparatus according to Embodiment 2.

Next, a configuration of the power supply control apparatus according to Embodiment 2 will be explained. FIG. 5 is a view illustrating a configuration of the power supply control apparatus according to Embodiment 2. As shown in FIG. 5, the power supply control apparatus 200 has an input supply power source 210, voltage monitoring circuits 220a to 220c, one-shot pulse generators 230a to 230c, DC-DC converters 240 to 260, and a load circuit 270.

The input supply power source 210 is a circuit for supplying a voltage to the DC-DC converters 240 to 260. A plus terminal of the input supply power source 210 is connected to Vin (+) of each of the DC-DC converters 240 to 260, and a minus terminal of the input supply power source 210 is connected to Vin (−) of each of the DC-DC converters 240 to 260. A voltage supplied from the input supply power source 210 to the DC-DC converters 240 to 260 is shown by Vin.

The voltage monitoring circuit 220a is a circuit for outputting a control signal to the one-shot pulse generator 230a when it detects Vin output from the input supply power source 210. The voltage monitoring circuit 220b is a circuit for outputting a control signal to the one-shot pulse generator 230b when it detects Vout 1 output from the DC-DC converter 240. The voltage monitoring circuit 220c is a circuit for outputting a control signal to the one-shot pulse generator 230c when it detects Vout 2 output from the DC-DC converter 250.

The one-shot pulse generator 230a is a circuit for outputting one pulse to the DC-DC converters 240 to 260 when it obtains the control signal from the voltage monitoring circuit 220a. The one-shot pulse generator 230b is a circuit for outputting one pulse to the DC-DC converters 240 to 260 when it obtains the control signal from the voltage monitoring circuit 220b. The one-shot pulse generator 230c is a circuit for outputting one pulse to the DC-DC converters 240 to 260 when it obtains the control signal from the voltage monitoring circuit 220c. In Embodiment 2, a pulse signal composed of one pulse is shown as a one-shot pulse.

The DC-DC converter 240 is a circuit for obtaining one-shot pulses from the one-shot pulse generators 230a to 230c and outputting the voltage Vout 1 to the load circuit 270 when a sum total of the obtained one-shot pulses reach a predetermined number. Specifically, the DC-DC converter 240 has a set circuit 240a and count circuit 240b. Note that the DC-DC converter 240 has Vin (+), Vin (−), Vout (+), Vout (−), and ON/OFF terminals as terminals.

The set circuit 240a is a circuit for setting a pulse number of a pulse signal acting as a timing at which Vout 1 is output. In the following explanation, the pulse number set by the set circuit 240a is shown as a first pulse number.

The count circuit 240b is a circuit for counting the pulse number of the one-shot pulses output from the one-shot pulse generators 230a to 230c and turning "ON" the ON/OFF terminals when the counted pulse number reaches the first pulse number. When the ON/OFF terminal of the DC-DC converter 240 is turned "ON" in a state that Vin is applied thereto from the input supply power source 210, the DC-DC converter 240 outputs the voltage Vout 1 to the load circuit 270.

The DC-DC converters 250 is a circuit for obtaining one-shot pulses from the one-shot pulse generators 230a to 230c and outputting a voltage Vout 2 to the load circuit 270 when a sum total of the obtained one-shot pulses reach a predetermined number. Specifically, the DC-DC converter 250 has a set circuit 250a and a count circuit 250b. Note that the DC-DC converter 250 has Vin (+), Vin (−), Vout (+), Vout (−), and ON/OFF terminals as terminals.

The set circuit 250a is a circuit for setting a pulse number of a pulse signal acting as a timing at which Vout 2 is output. In the following explanation, the pulse number set by the set circuit 250a is shown as a second pulse number.

The count circuit 250 is a circuit for counting a pulse number of the one-shot pulses output from the one-shot pulse generators 230a to 230c and turning "ON" the ON/OFF terminals when the counted pulse number reaches the second pulse number. When the ON/OFF terminal of the DC-DC converter 250 is turned "ON" in a state that Vin is applied thereto from the input supply power source 210, the DC-DC converter 250 outputs the voltage Vout 2 to the load circuit 270.

The DC-DC converter 260 is a circuit for obtaining one-shot pulses from the one-shot pulse generators 230a to 230c and outputting a voltage Vout 3 to the load circuit 270 when a sum total of the obtained one-shot pulses reach a predetermined number. Specifically, the DC-DC converter 260 has a set circuit 260a and a count circuit 260b. Note that the DC-DC converter 260 has Vin (+), Vin (−), Vout (+), Vout (−), and ON/OFF terminals as terminals.

The set circuit 260a is a circuit for setting a pulse number of a pulse signal acting as a timing at which Vout 3 is output. In the following explanation, the pulse number set by the set circuit 260 is shown as a third pulse number.

The count circuit 260b is a circuit for counting a pulse number of the one-shot pulses output from the one-shot pulse generators 230a to 230c and turning "ON" the ON/OFF terminal when the counted pulse number reaches the third pulse number. When the ON/OFF terminal of the DC-DC converter 260 is turned "ON" in a state that Vin is applied thereto from the input supply power source 210, the DC-DC converter 260 outputs the voltage Vout 3 to the load circuit 270.

The load circuit 270 is a circuit for executing various processes making use of the voltages sequentially supplied from the DC-DC converters 240 to 260. A core circuit, an IO circuit, and various LSIs, for example, are mounted on the load circuit 270.

It is preferable to adjust a first pulse number, a second pulse number, and a third pulse number set to the count circuits 240b to 260b according to a power supply sequence of the voltages Vout 1 to 3 to adjust the power supply sequence of the voltages Vout 1 to 3 supplied to the load circuit 270. When, for example, the voltages Vout 1, Vout 2, and Vout 3 are sequentially supplied to the load circuit 270 in this order, the first, second, and third pulse numbers may be sufficiently adjusted such that first pulse number<second pulse number<third pulse number.

Note that detailed explanation of the set circuits 240a to 260a and the count circuits 240b to 260b shown in FIG. 5 are the same as that of the set circuits 130a to 150a and the count circuits 130b to 150b shown in Embodiment 1 (refer to FIG. 3).

Figure 6:
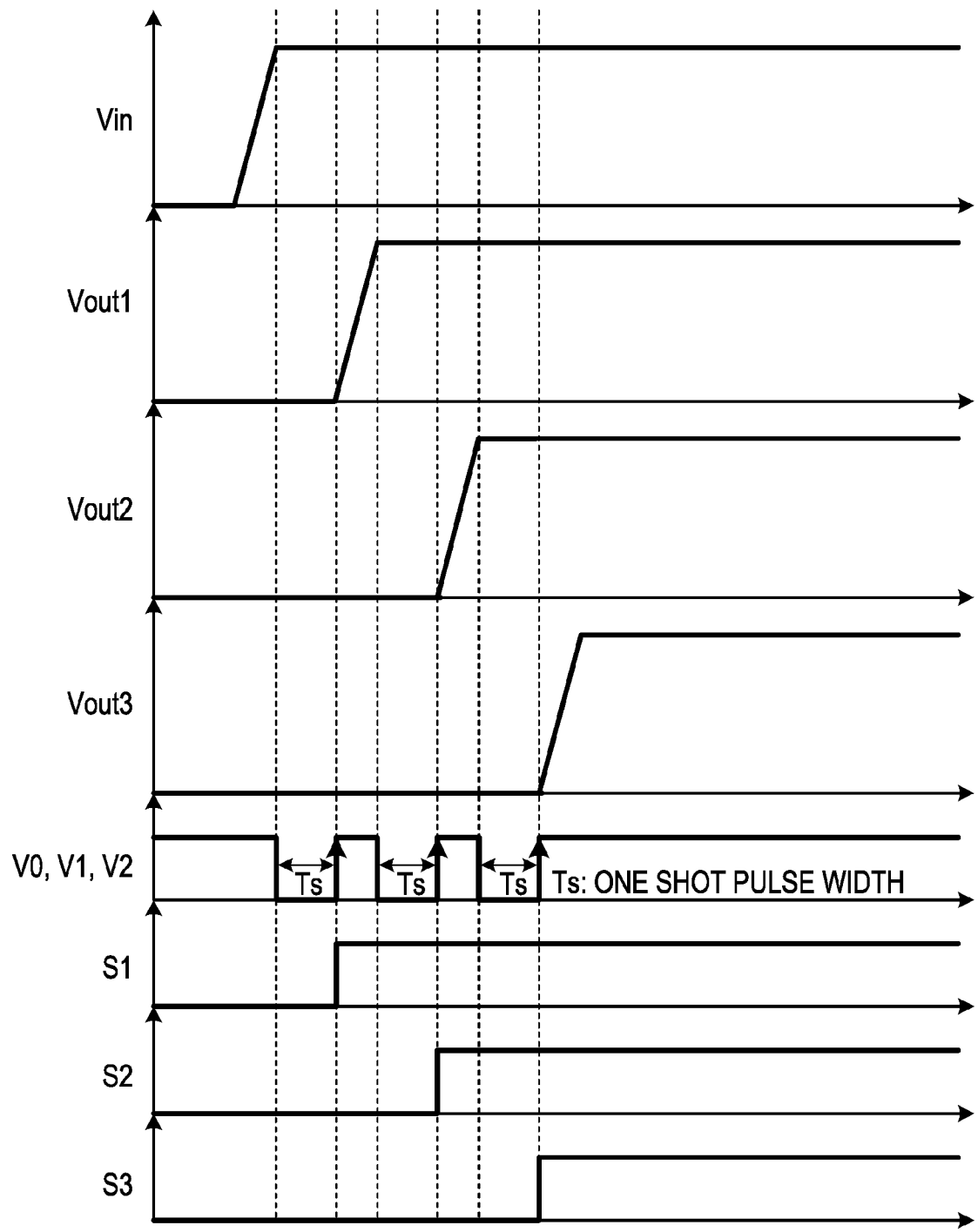
FIG. 6 is a view illustrating operation waveforms of the power supply control apparatus according to Embodiment 2.
Figure 7:
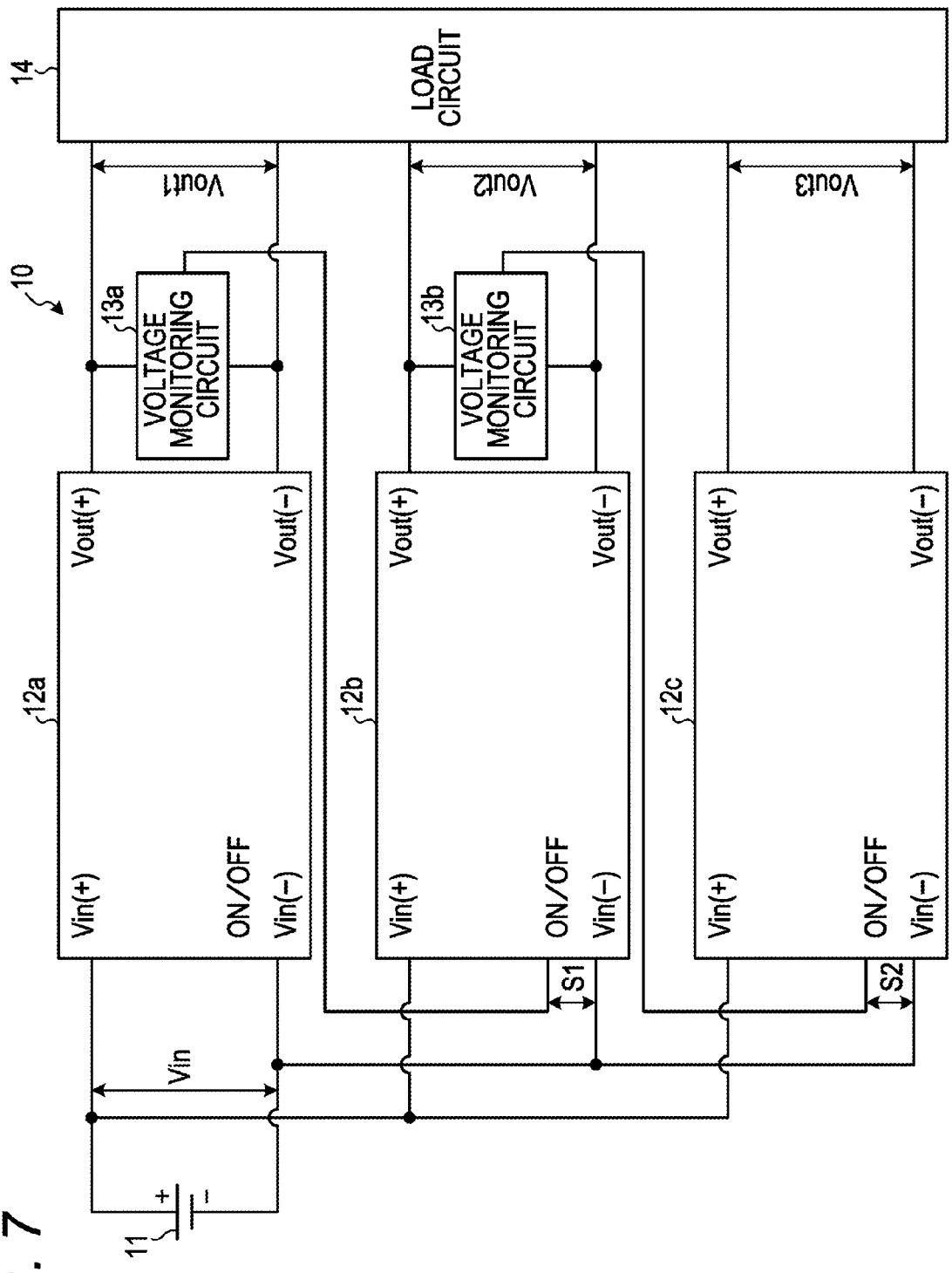
FIG. 7 is a view illustrating a configuration of a first conventional power supply control apparatus.
Figure 8:
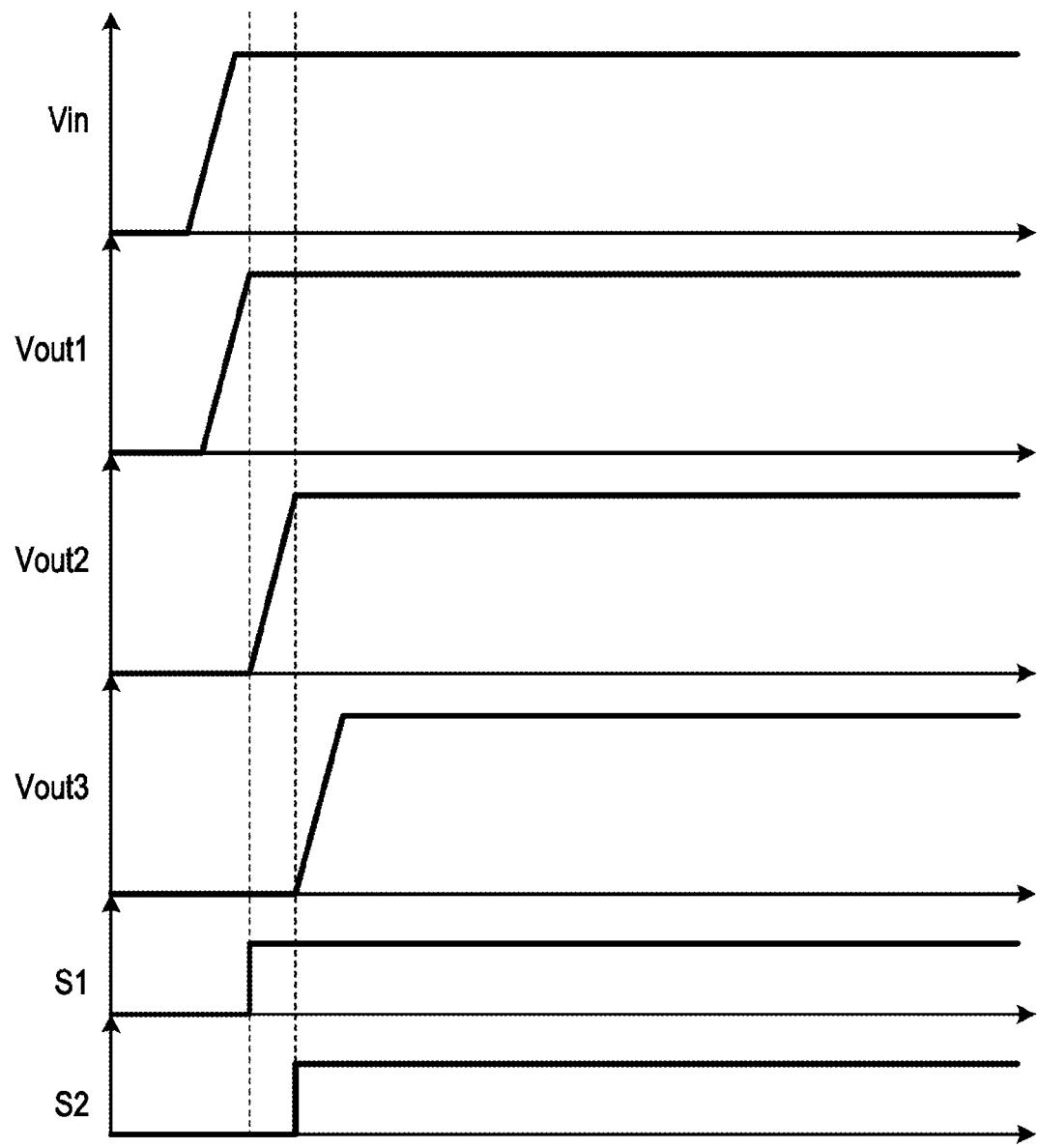
FIG. 8 is a view illustrating operation waveforms of the first power supply control apparatus.
Figure 9:
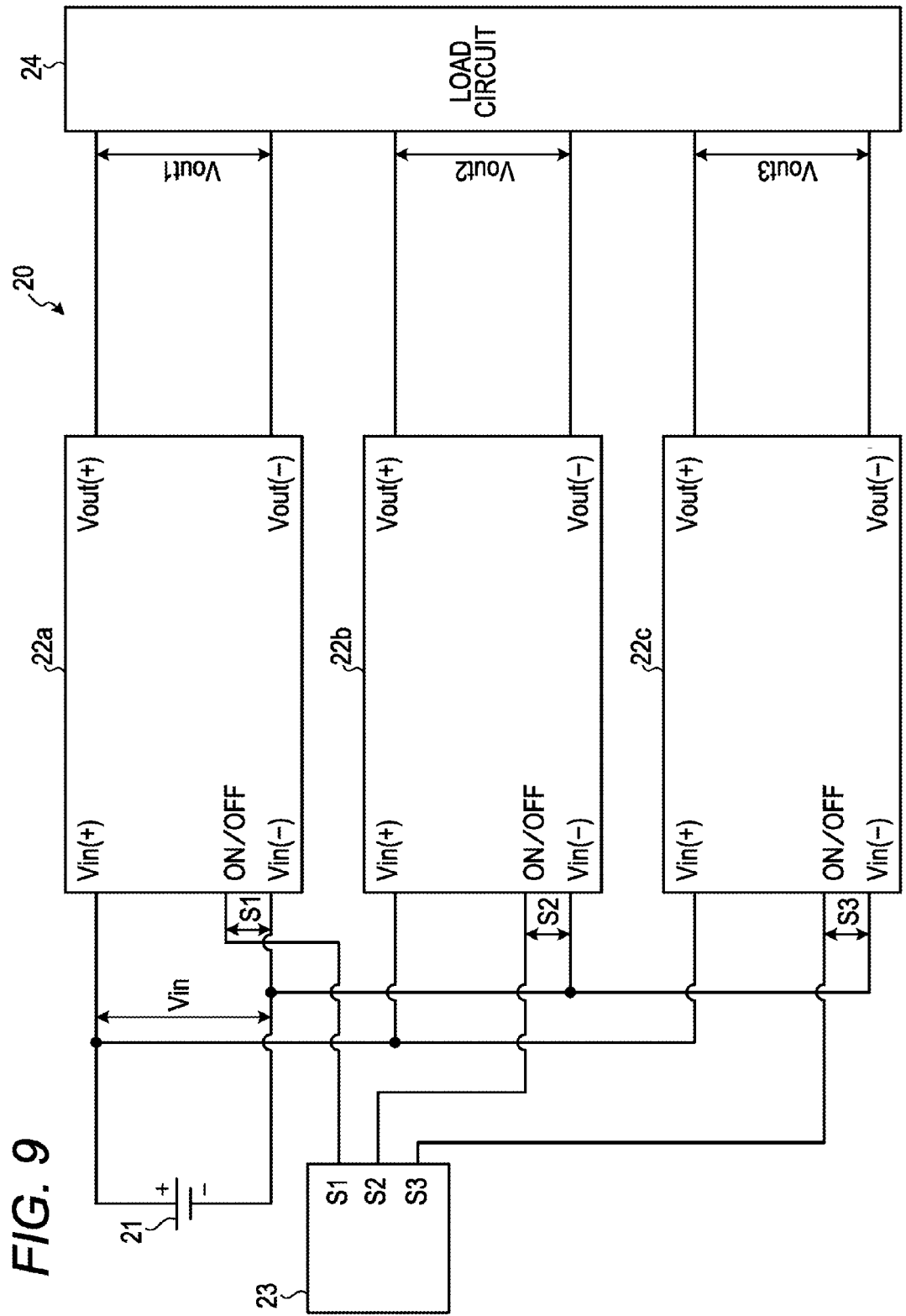
FIG. 9 is a view illustrating a configuration of a second conventional power supply control apparatus.
Figure 10:
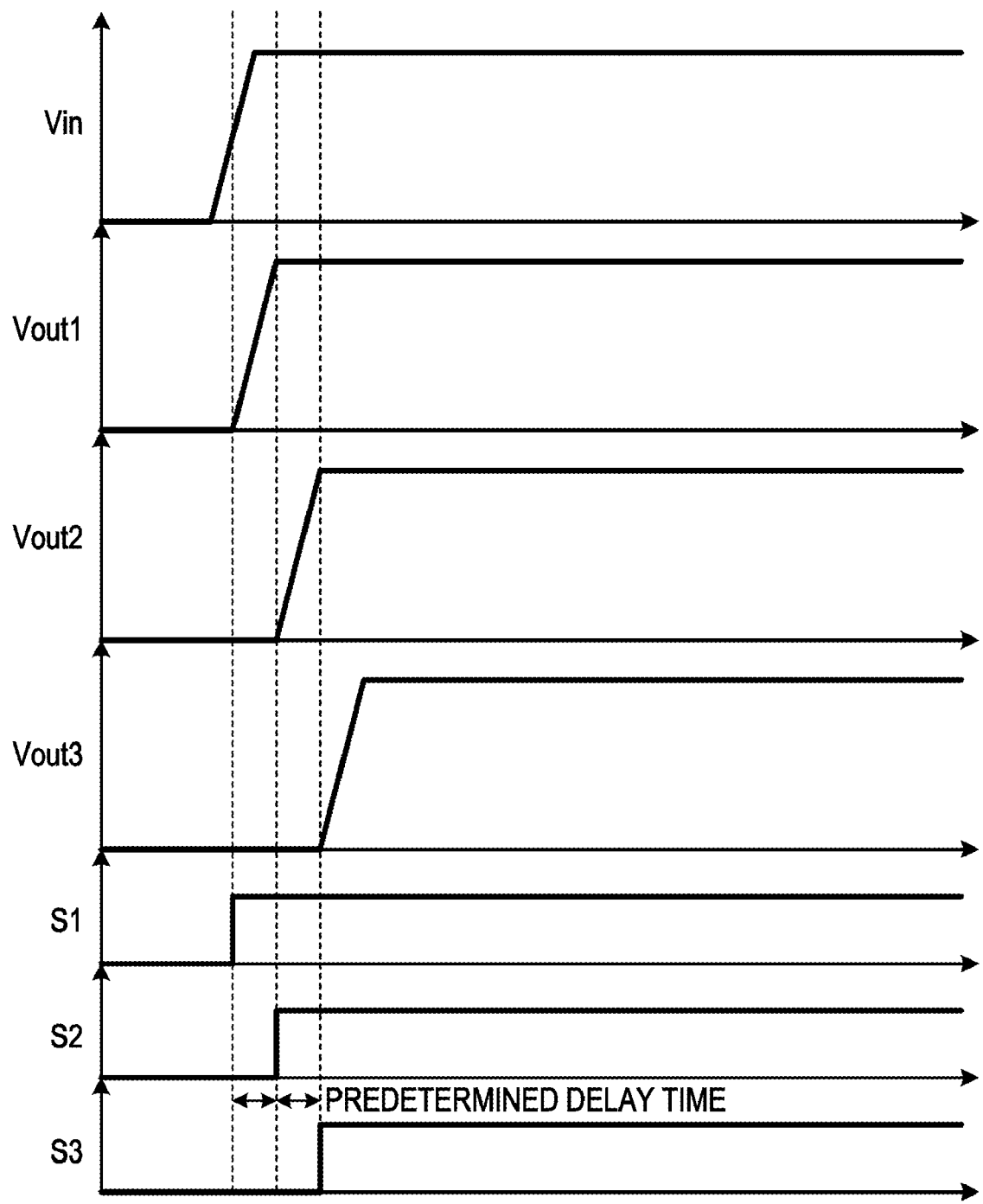
FIG. 10 is a view illustrating operation waveforms of the second power supply control apparatus.

Next, an operation waveform of the power supply control apparatus 200 shown in FIG. 5 will be explained. FIG. 6 is a view illustrating the operation waveform of the power supply control apparatus 200 according to Embodiment 2. Note that the first pulse number of the count circuit 240b is set to "1", the second pulse number of the count circuit 250b is set to "2", and the third pulse number of the count circuit 260b is set to "3" as an example.

When the input supply power source 210 supplies Vin to the DC-DC converters 240 to 260 (refer to Vin of FIG. 6), the voltage monitoring circuit 220a detects Vin and outputs a control signal to the one-shot pulse generator 230a which in turn outputs one-shot pulses to the DC-DC converters 240 to 260 (refer to V0 of FIG. 6).

The count circuit 240b obtains the one-shot pulse output from the one-shot pulse generator 230a and outputs a control signal S1 to the ON/OFF terminal when a pulse number becomes "1" (refer to S1 of FIG. 6) to thereby turn "ON" the ON/OFF terminal. When the ON/OFF terminal is turned "ON", the DC-DC converter 240 outputs Vout 1 (refer to Vout 1 of FIG. 6).

The voltage monitoring circuit 220b detects Vout 1 and outputs a control signal to the one-shot pulse generator 230b which in turn outputs one-shot pulses to the DC-DC converters 240 to 260 (refer to V1 of FIG. 6; one-shot pulse is output from the one-shot pulse generator 230a with a delay Ts).

The count circuit 250b obtains the one-shot pulse output from the one-shot pulse generator 230b and outputs a control signal S2 to the ON/OFF terminal when a pulse number becomes "2" (refer to S2 of FIG. 6) to thereby turn "ON" the ON/OFF terminal. When the ON/OFF terminal is turned "ON", the DC-DC converter 250 outputs Vout 2 (refer to Vout 2 of FIG. 6).

The voltage monitoring circuit 220c detects Vout 2 and outputs a control signal to the one-shot pulse generator 230c which in turn outputs one-shot pulses to the DC-DC converters 240 to 260 (refer to V2 of FIG. 6; one-shot pulse is output from the one-shot pulse generator 230b with a delay Ts).

The count circuit 260b obtains the one-shot pulse output from the one-shot pulse generator 230c and outputs a control signal S3 to the ON/OFF terminal when a pulse number becomes "3" (refer to S3 of FIG. 6) to thereby turn "ON" the ON/OFF terminal. When the ON/OFF terminal is turned "ON", the DC-DC converter 260 outputs Vout 3 (refer to Vout 3 of FIG. 6).

As described above, the power supply control apparatus 200 according to Embodiment 2 has the one-shot pulse generators for outputting single pulse signals in place of the pulse signal generating circuit and controls power supplied to the load circuit 270 by that the DC-DC converters 240 to 260 count the one-shot pulses output from the one-shot pulse generators 230a to 230c and control a timing at which a voltage is output. As a result, a power supply sequence can be accurately controlled by suppressing an adverse effect due to a disturbance, a delay and the like of a pulse signal.

In a conventional voltage monitoring circuit and a conventional delay signal circuit, since setting of a sequence is changed depending on a configuration of a load circuit, many types of settings are demanded to change and the number of components for setting constants for this purpose increases, resulting in an increase of a setting process cost and a manufacture management cost. However, in the power supply control apparatus 200 of the invention, since a sequence can be set only by setting a pulse number by a logic circuit, even if a configuration of a load circuit changes, the change can be coped with only by changing setting of a pulse by the same circuit. Accordingly, the invention can reduce a design manpower cost and a manufacture management cost.

In the power supply control apparatus 200 according to embodiment 2, a start-up sequence can be arbitrarily changed only by changing setting of a control circuit without switching a destination of connection of a control line. As a result, the start-up sequence can be changed by simply changing setting without modifying a wiring substrate.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

What is claimed is:

1. A power supply control apparatus including:
a pulse generator configured to generate a pulse signal; and
a plurality of power supply units configured to supply electric power, each of the plurality of power supply units including a DC-DC converter, the DC-DC converter including an on/off terminal configured to be accommodated in the DC-DC converter and to initiate to exteriorly supply an electric power from the DC-DC converter in accordance with the on/off terminal being turned on, a set circuit configured to set a pulse number given, and a count circuit configured to receive the pulse number from the set circuit, and to set the on/off terminal being turned on when, by counting a pulse of the pulse signal, the number of counted pluses reaches the pulse number.

2. A power supply control apparatus comprising:
a pulse generator configured to generate a pulse signal; and
a plurality of power supply units configured to supply electric power to a plurality of electric circuits respectively, each of the plurality of power supply units including an on/off terminal configured to be accommodated in the power supply unit and to initiate to exteriorly supply an electric power from the power supply unit in accordance with the on/off terminal being turned on, a plurality of AND circuits to which a first signal and a second signal are input, an adjusting unit configured to output the first signal to the plurality of AND circuits at adjusted timing, a shift register configured to output the second signal to one of the AND circuits which corresponds to the number of pulses of the pulse signal counted by a counter,
wherein at least one of the AND circuits outputs a signal for turning on the on/off terminal.

3. A power supply control apparatus comprising:
a pulse generator configured to generate a pulse signal; and
a plurality of power supply units configured to supply electric power to a plurality of electric circuits respectively, each of the plurality of power supply units including a DC-DC converter, the DC-DC converter including an on/off terminal configured to be accommodated in the DC-DC converter and to initiate to exteriorly supply an electric power from the DC-DC converter in accordance with the on/off terminal being turned on, a set circuit configured to set a pulse number given, and a count circuit configured to receive the pulse number from the set circuit, and to set the on/off terminal being turned on when, by counting a pulse of the pulse signal, the number of counted pulses reaches the pulse number.

4. A power supply control apparatus comprising:

a pulse generator configured to generate a pulse signal; and a plurality of power supply units configured to supply electric power to a plurality of electric circuits respectively, each of the plurality of power supply units including an on/off terminal configured to be accommodated in the power supply unit and to initiate to exteriorly supply an electric power from the power supply unit in accordance with the on/off terminal being turned on, a plurality of AND circuits to which a first signal and a second signal are input, and an adjusting unit configured to output the first signal to the plurality of AND circuits at adjusted timing, a shift register configured to output the second signal to one of the AND circuits which corresponds to the number of pulses of the pulse signal counted by a counter, wherein at least one of the AND circuits outputs a signal for turning on the on/off terminal.

* * * * *